(12) United States Patent
Komeno et al.

(10) Patent No.: US 6,346,976 B1
(45) Date of Patent: Feb. 12, 2002

(54) LIQUID CRYSTAL DISPLAY DEVICE

(75) Inventors: Hitoshi Komeno, Mobara (JP); Tsutomu Sato, Maidenhead (GB)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/443,107

(22) Filed: Nov. 18, 1999

(30) Foreign Application Priority Data

Nov. 19, 1998 (JP) ............................................. 10-329666

(51) Int. Cl.[7] ............................................. G02F 1/1345
(52) U.S. Cl. ........................................ 349/139; 349/152
(58) Field of Search ........................ 349/42, 139, 149, 349/152, 150, 151

(56) References Cited

U.S. PATENT DOCUMENTS

| | | | | |
|---|---|---|---|---|
| 5,751,381 A | * | 5/1998 | Ono et al. ................... | 349/139 |
| 5,914,763 A | * | 6/1999 | Fujii et al. ................... | 349/149 |
| 5,949,502 A | * | 9/1999 | Matsunaga et al. ........... | 349/42 |

* cited by examiner

Primary Examiner—William L. Sikes
Assistant Examiner—Tai V. Duong
(74) Attorney, Agent, or Firm—Antonelli, Terry, Stout & Kraus, LLP

(57) ABSTRACT

A liquid crystal display device effectively absorbs static electricity which enters from outside, and prevents damage to switching elements or the like. In the liquid crystal display device, an active matrix substrate has a plurality of scanning signal lines for applying driving signals to a plurality of switching elements for selecting pixels formed in a display area, a plurality of video signal lines, pixel electrodes and common electrode connecting terminals, and the active matrix substrate is bonded to a color filter substrate having common electrodes which constitute the pixels, with a liquid crystal layer interposed between the substrates. The common electrode connecting terminals and the common electrodes are connected to each other via a conductive layer, and the periphery of the display area is secured with a sealing material clamped therein. The liquid crystal display device is provided with a plurality of conductive layers which are formed over video signal lines whose cut ends are exposed on a side surface of the active matrix substrate, with an insulation layer interposed between the conductive layers and the video signal lines, and a connecting line layer which connects the conductive layers to the common electrode connecting terminals.

2 Claims, 10 Drawing Sheets

LIQUID CRYSTAL DISPLAY DEVICE

BACKGROUND OF THE INVENTION

The present invention relates to a liquid crystal display device provided with a construction for protecting switching elements, which are formed over an active matrix substrate, from static electricity.

Liquid crystal display devices are widely used for the display of various kinds of images including still pictures or moving pictures.

Liquid crystal display devices are classified into two types. There is a first type in which a layer of liquid crystal compounds (a liquid crystal layer) is clamped between two insulating substrates, at least one of which is made of transparent glass or the like, and predetermined pixels are turned on or off by selectively applying a voltage to various kinds of pixel-forming electrodes formed over the insulating substrates; and there is a second type in which active elements made of the aforesaid various kinds of electrodes and switching elements, such as pixel-selecting thin-film transistors (TFTs), are formed, and predetermined pixels are turned on or off by selectively driving these active elements.

The latter type of liquid crystal display device is called an active matrix type device and has become a leading liquid crystal display device because of its contrast performance, its high-speed display performance and the like.

In general, the active matrix type of liquid crystal display device is of a so-called vertical electric field type in which an electric field for changing the direction of alignment of a liquid crystal layer is applied between a plurality of scanning electrodes, a plurality of video signal electrodes and pixel electrodes, all of which are formed over an active matrix substrate, which form one insulating substrate, and a common electrode which is disposed over a color filter substrate, which is forms the other substrate. In addition, in the periphery of the effective display area of the active matrix substrate of the active matrix type of liquid crystal display device, a protecting circuit for protecting thin-film transistors or other electrodes from static electricity, which enters from outside, is formed on the scanning signal lines (in this case, gate signal lines) for driving the thin-film transistors or the like, which form the switching elements, and the video signal lines (in this case, drain signal lines).

FIG. 10 is a top plan view illustrating an essential electrode pattern of an active matrix substrate of the type used in a conventional active matrix type of liquid crystal device. In FIG. 10, symbol SUB1 denotes an active matrix substrate, symbol SUB2 denotes a color filter substrate (in FIG. 10, there is shown only an external line which represents the bonding position of the color filter substrate), symbol COM1 denotes common electrode connecting terminals, symbol SL denotes a sealing material which bonds and secures the active matrix substrate SUB1 and the color filter substrate SUB2 to each other, symbol DL denotes video signal lines (hereinafter referred to as the drain lines), and symbol CHI denotes driving circuits (integrated circuits).

FIG. 11 is a side view illustrating the structure of an essential portion of a side surface C of a top side of the substitution FIG. 10. In FIG. 11, symbols identical to those used in FIG. 10 correspond to portions identical to those shown in FIG. 10, and symbol GI denotes an insulation layer and symbol PSV1 denotes a transparent protective layer. Both the insulation layer GI and the transparent protective layer PSV1 are made of an insulation material such as SiN. Although an alignment layer is formed over the top surface of the transparent protective layer PSV1 before the transparent protective layer PSVI is applied to the color filter substrate, the illustration of the alignment layer is omitted in FIG. 11. Scanning signal lines (gate lines) which extend sideways as viewed in FIG. 10 to cross the drain lines DL, and driving circuits (integrated circuits) for applying scanning driving signals to the gate electrodes are formed over the active matrix substrate SUB1, but the illustration of such gate tines and driving circuits is omitted in FIG. 10.

The active matrix substrate SUB1, in its manufacturing process, is worked into a shape having a panel size by forming individual signal lines, thin-film transistors, a short bar, a short-circuit detecting terminal and the like over a mother glass and cutting the mother glass inside the short bar and the detecting terminal after the application of the required deposition. Accordingly, the cut ends of the drain tines DL are exposed on the side surface of the portion C of FIG. 10, as shown in FIG. 11. The drain lines DL are covered with the protective layer PSV1 over the surface of the active matrix substrate SUB1, but the cut ends of the drain lines DL are exposed on the side surface of a cut edge of the active matrix substrate SUB1.

SUMMARY OF THE INVENTION

Since the cut ends of the drain lines DL are exposed on the side surface of the active matrix substrate SUBI, as described above, there is the problem that when static electricity occurs in the active matrix substrate or in the vicinity of the outside thereof in handling the substrate during the manufacturing process, this static electricity enters the drain lines DL through the cut ends thereof and breaks down switching elements, such as thin-film transistors connected to the drain lines, or disconnects other lines. If a thin-film transistor breaks down or a disconnection occurs in a line, a so-called line defect occurs in the screen of a finished liquid crystal display device, degrading the image quality thereof to a remarkable extent.

An object of the present invention is to provide a liquid crystal display device which prevents breakdown of switching elements, such as thin-film transistors, or the disconnection of other lines by effectively absorbing static electricity which enters drain lines, thereby enabling production of a high-quality image display device.

To achieve the above object, the present invention is characterized by a construction in which conductive layers are formed above drain lines and are connected to common electrode connecting terminals of a color filter substrate so that static electricity which enters drain lines is effectively absorbed. A typical example of such a construction is described below.

In a liquid crystal display device in which an active matrix substrate has a plurality of switching elements for selecting pixels formed in a display area, a plurality of scanning signal lines for applying driving signals to the switching elements, a plurality of video signal lines, pixel electrodes and common electrode connecting terminals, the active matrix substrate is bonded to a color filter substrate having common electrodes which constitute the pixels, with a liquid crystal material interposed between both substrates. The common electrode connecting terminals and the common electrodes are connected to each other via a conductive paste, and the periphery of the display area is secured with a seating material. The liquid crystal display device is provided with a plurality of conductive layers which are formed over video signal lines whose cut ends are exposed on a side surface of the active matrix substrate, an insulation layer interposed between the conductive layers and the video signal lines, and a connecting line layer which connects the conductive layers to the common electrode connecting terminals.

In addition, each of the conductive layers is formed in a linear shape which is parallel to a longitudinal direction of the video signal lines, at a position corresponding to a portion between adjacent ones of the plurality of video signal lines, whereby it is possible to effectively absorb static electricity which enters the drain lines.

In the liquid crystal display device having the above-described construction, the electrostatic breakdown of switching elements or other electrodes in the manufacturing process is decreased to a remarkable extent, whereby a high-quality image display device can be obtained and the manufacturing yield factor is improved to a great extent.

As a matter of course, the present invention is not limited to only the above-described construction and various modifications can be made without departing from the technical concept of the present invention. For example, although the above-described construction takes account of the entrance of static electricity through the cut ends of the drain lines, similar conductor layers may also be formed near the cut ends of gate lines Which cross the drain lines so that static electricity is also prevented from entering the gate lines.

These and other objects, features and advantages of the present invention will become more apparent from the following description when taken in conjunction with the accompanying drawings.

BRIEF DESCRIPTION OF THE DRAWINGS

FIGS. 2A and 2B are side views of the top side of the active matrix substrate shown in FIG. 1B, wherein FIG. 2A shows a portion A thereof and FIG. 2B shows a portion B thereof;

FIGS. 4A and 4B are side views of the top side of the active matrix substrate shown in FIG. 3B, wherein FIG. 4A shows a portion A thereof and FIG. 4B shows a portion B thereof;

DETAILED DESCRIPTION

Embodiments of a liquid crystal display device according to the present invention will be described below in detail with reference to the drawings.

Figure 1A:
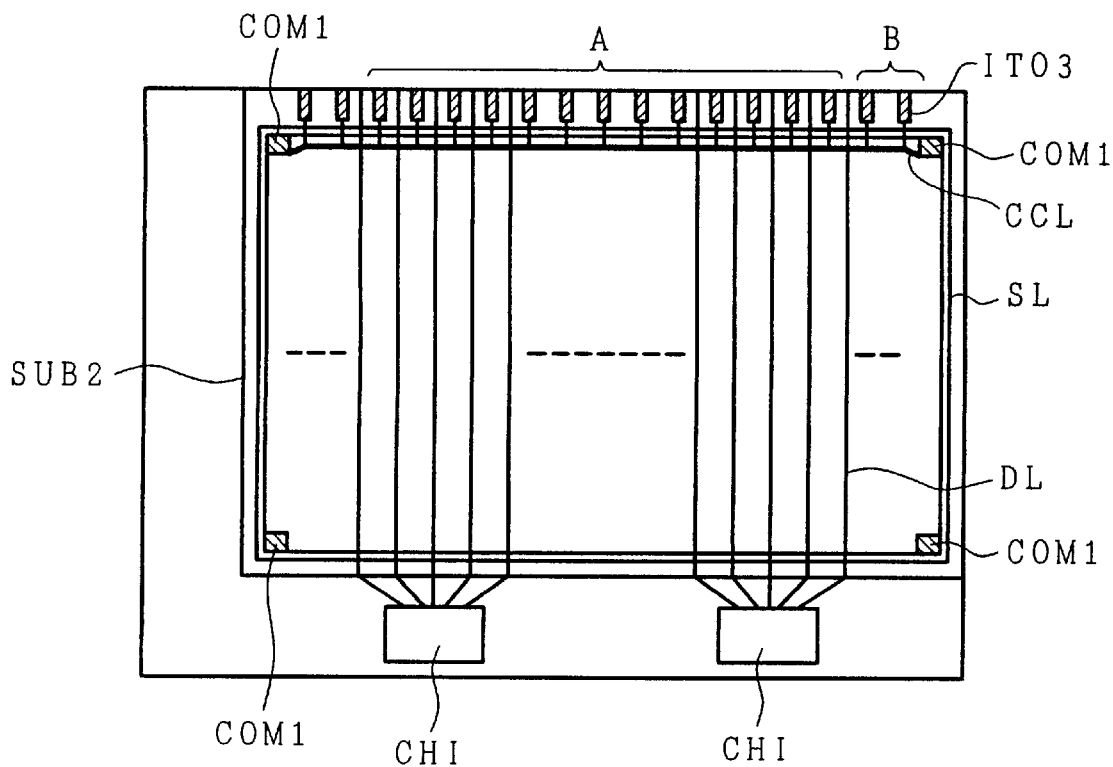
FIG. 1A is a plan view of an active matrix substrate, illustrating a first embodiment of a liquid crystal display device according to the present invention.
Figure 1B:
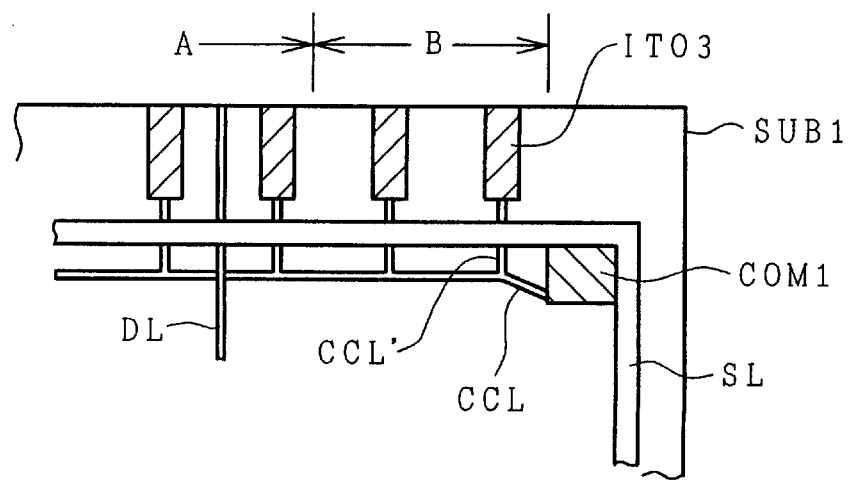
FIG. 1B is an enlarged view of a top right corner portion of the plan view of FIG. 1A.
Figure 10:
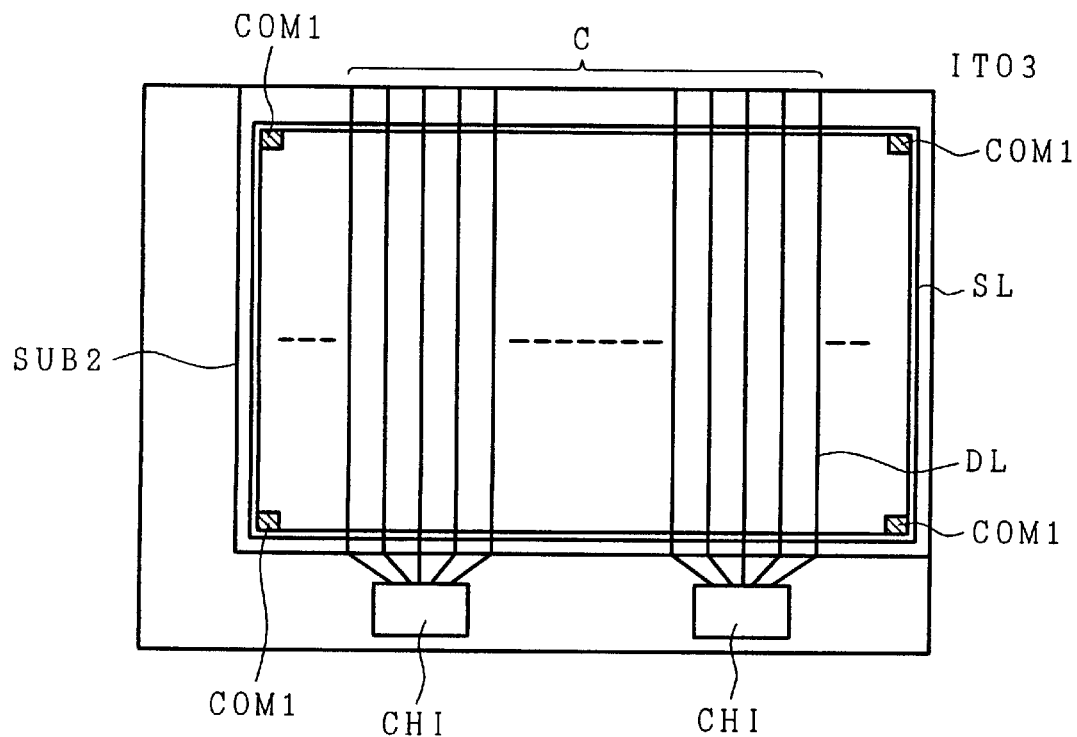
FIG. 10 is a diagrammatic top plan view illustrating an essential electrode pattern of an active matrix substrate which constitutes a conventional active matrix type of liquid crystal device.
Figure 11:
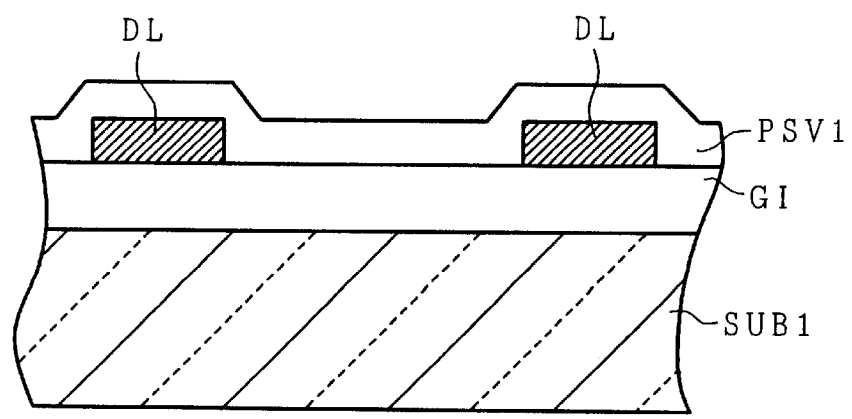
FIG. 11 is a side view illustrating the structure of an essential portion of a side surface C of a top side of the substrate in FIG. 10.

FIGS. 1A and 1B are plan views of an active matrix substrate, illustrating a first embodiment of the liquid crystal display device according to the present invention. FIG. 1A is a general view, while FIG. 1B is an enlarged view of a top right corner portion of FIG. 1A.; In FIGS. 1A and 1B, portions identical to those shown in FIG. 10 are denoted by symbols identical to those used in FIG. 10; and symbol IT03 denotes conductor layers suitably made of Indium-Tin-Oxide, symbol COM1 denotes common electrode connecting terminals for connection to common electrode connecting terminals of a color filter substrate, and symbol CCL denotes a connecting line which connects the plurality of conductor layers IT03 to the common electrode connecting terminals COM1. Although FIGS. 1A and 1B show an example in which the common electrode connecting terminals COM1 are located at four corners, it is basically sufficient to provide one common electrode connecting terminal COM1. Like the aforementioned FIG. 1g in FIGS. 1A and 1B as well, the illustration of gate lines is omitted.

The conductor layers IT03 are formed in a comb-teeth like shape in a portion extending outside a sealing material of the drain lines, and the outward ends of the conductor layers IT03 are positioned on a side surface of the active matrix substrate SUB1 to serve a function similar to a surge arrester. The inward ends of the conductor layers IT03 are connected to the common electrode connecting terminals COM1 by the connecting line CCL.

Figure 2A:
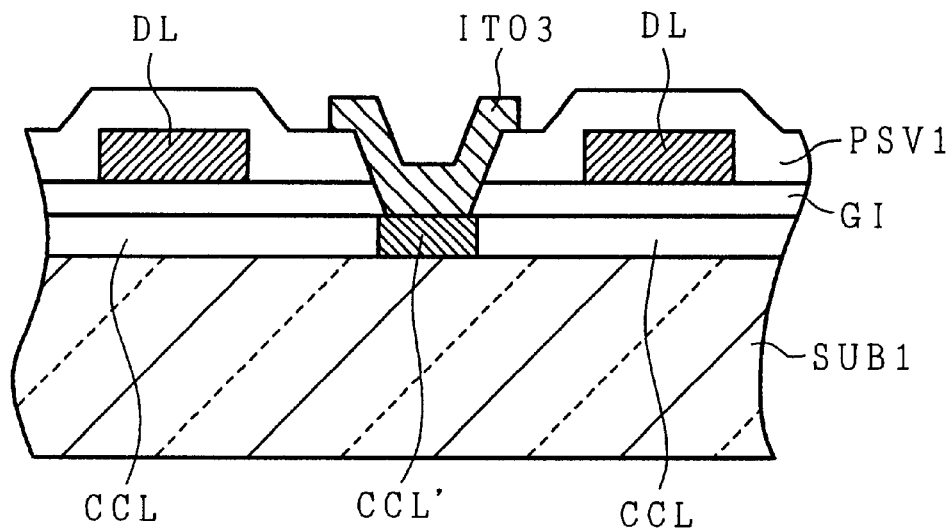
Figure 2B:
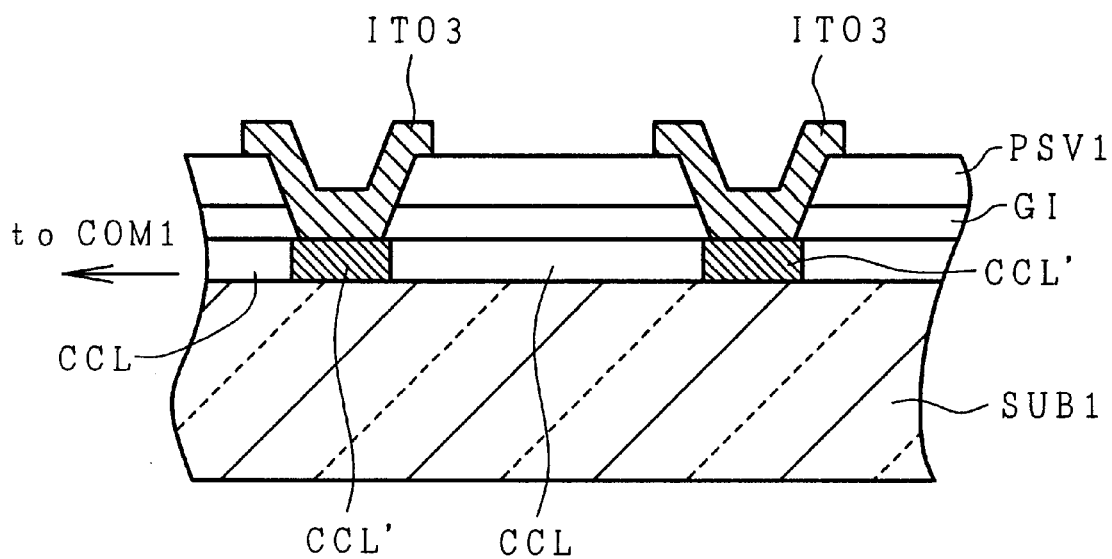

FIGS. 2A and 2B are side views of the top side of the active matrix substrate shown in FIGS. 1A and 1B, wherein FIGS. 2A and 2B correspond to portions A and B, respectively. In the portion A of FIGS. 1A and 1B, the cut ends of the drain lines DL are exposed as shown in FIG. 2A. The connecting line layer CCL is formed in the lowermost layer on an inside surface of the active matrix substrate SUB1, and it interconnects the conductor layers IT03 which are formed in the comb-teeth like shape so that each of the conductor layers IT03 is positioned between adjacent ones of the drain lines DL. The connecting line layer CCL is formed below and, is electrically connected to the overlying conductor layers IT03, and it is extended to the common electrode connecting terminals COM1 in both inside edge portions of the active matrix substrate SUB1.

More specifically, the connecting line layer, CCL, which is formed of a conductive material, suitably, chromium Cr, is formed in a peripheral portion of the sealing material SL of the active matrix substrate SUB1. Branch portions CCL' of the connecting line layer CCL are disposed in alignment with and below positions at which the respective conductor layers IT03 are formed. After the formation of the connecting line layer CCL (and the branch portions CCL'), the insulation layer GI, the drain lines DL and the transparent protective layer PSVL are formed in a stacked manner.

The conductor layers IT03 are formed by vacuum evaporation, CVD or the like in openings which are formed by etching the insulation layer GI and the transparent protective layer PSVL by photolithography techniques or the like and exposing the branch portions CCL' of the connecting line layer CCL. Incidentally, it is preferable to form the connecting line layer CCL (and the branch portions CCL') at the same time as the formation of the common electrode connecting terminals COM1.

In accordance with the present embodiment, the electrostatic breakdown of thin-film transistors or other electrodes in the process of manufacturing active matrix substrates is decreased to a remarkable extent, whereby a high-quality image display device can be obtained and the manufacturing yield factor is improved to a great extent.

Figure 3A:
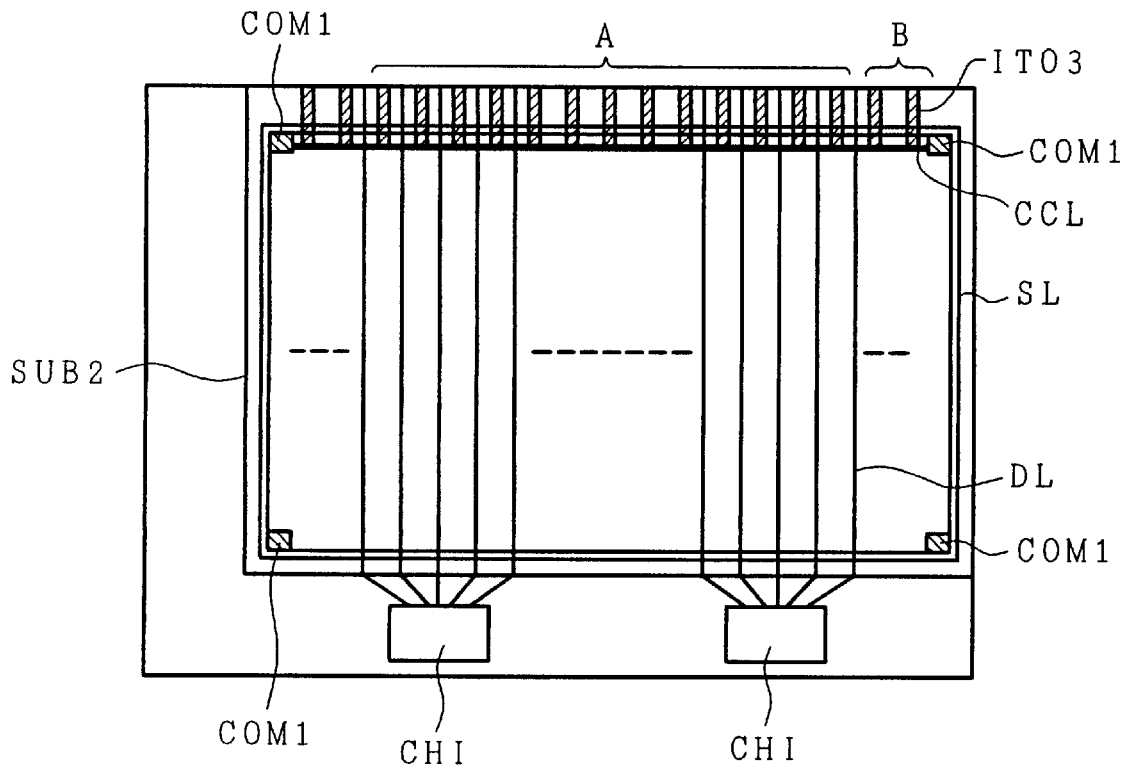
FIG. 3A is a plan view of an active matrix substrate, illustrating a second embodiment of the liquid crystal display device according to the present invention.
Figure 3B:
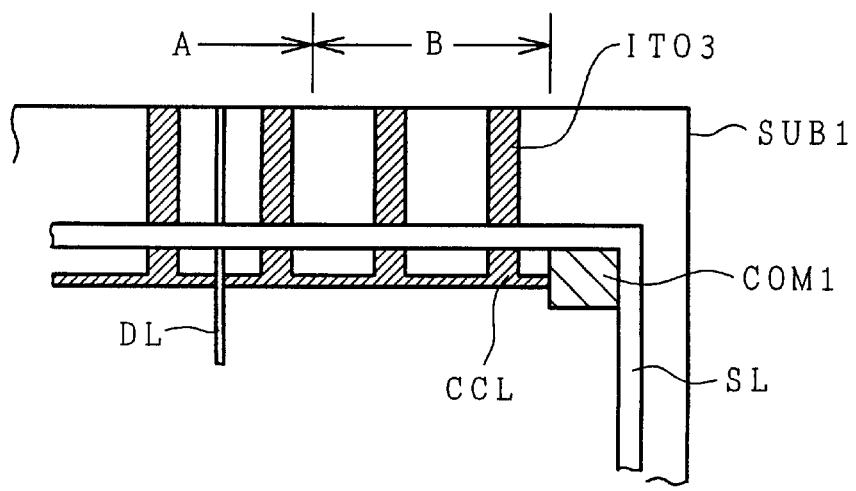
FIG. 3B is an enlarged view of a top right corner portion of the plan view of FIG. 3A.

FIGS. 3A and 3B are plan views of an active matrix substrate, illustrating a second embodiment of the liquid crystal display device according to the present invention. FIG. 3A is a general view, while FIG. 3B is an enlarged view of a top right corner portion of FIG. 3A. In FIGS. 3A and 3B, portions identical to those shown in FIGS. 1A to 2B are denoted by symbols identical to those used in FIGS. 1A to 2B, and symbol IT03 denotes conductor layers suitably made of Indium-Tin-Oxide, symbol COM1 denotes common electrode connecting terminals for connection to common electrode connecting terminals of a color filter substrate, and symbol CCL denotes a connecting line which connects the plurality of conductor layers IT03 to the common electrode connecting terminals COM1. In this embodiment as well, it is basically sufficient to provide one common electrode connecting terminal COM1. In FIGS. 3A and 3B as well, the illustration of gate lines is omitted.

The conductor layers IT03 are formed in a comb-teeth like shape in a portion extending outside a scaling material of the drain lines, and the outward ends of the conductor layers IT03 are positioned on a side surface of the active matrix substrate SUB1 to serve a function similar to a lightning arrester (surge arrester), and the inward ends of the conductor layers IT03 are connected to the common electrode connecting terminals COM1 by the connecting line CCL.

Figure 4A:
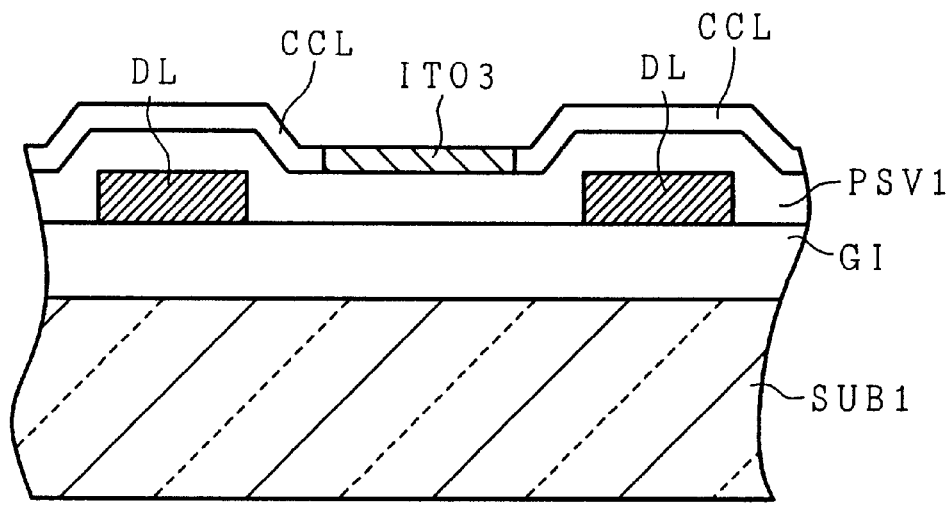
Figure 4B:
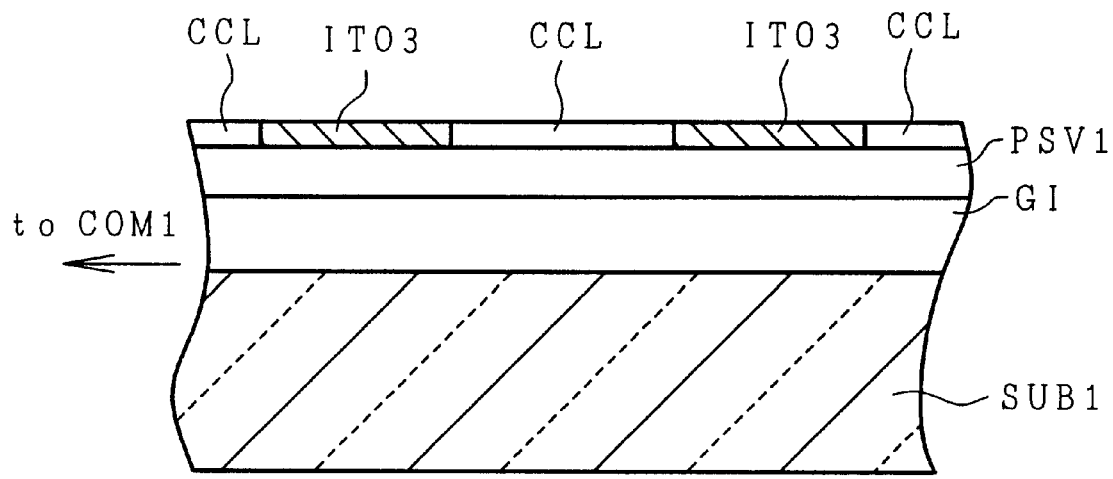

FIGS. 4A and 4B are side views of the top side of the active matrix substrate shown in FIGS. 3A and 3B, wherein FIGS. 4A and 4B correspond to portions A and B of FIGS. 3A and 3B, respectively. In the portion A of FIGS. 3A and 3B, the cut ends of the drain lines DL are exposed as shown in FIG. 4A. The conductor layers IT03 and the connecting line layer CCL are formed over the transparent protective layer PSV1 formed over the drain lines DL, and the conductor layers IT03 are formed in the comb-teeth like shape so that each of the conductor layers IT03 is positioned between adjacent ones of the drain lines DL. The connecting line layer CCL is electrically connected to the common electrode connecting terminals COM1 in both inside edge portions of the active matrix substrate SUB1. In other words, in the present embodiment, the conductor layers IT03 which serve as a lightning arrester (surge arrester) and the connecting line layer CCL are formed over the same surface.

In accordance with the present embodiment as well, the electrostatic breakdown of thin-film transistors or other electrodes in the process of manufacturing active matrix substrates is decreased to a remarkable extent, whereby a high-quality image display device can be obtained and the manufacturing yield factor is improved to a great extent.

Figure 5:
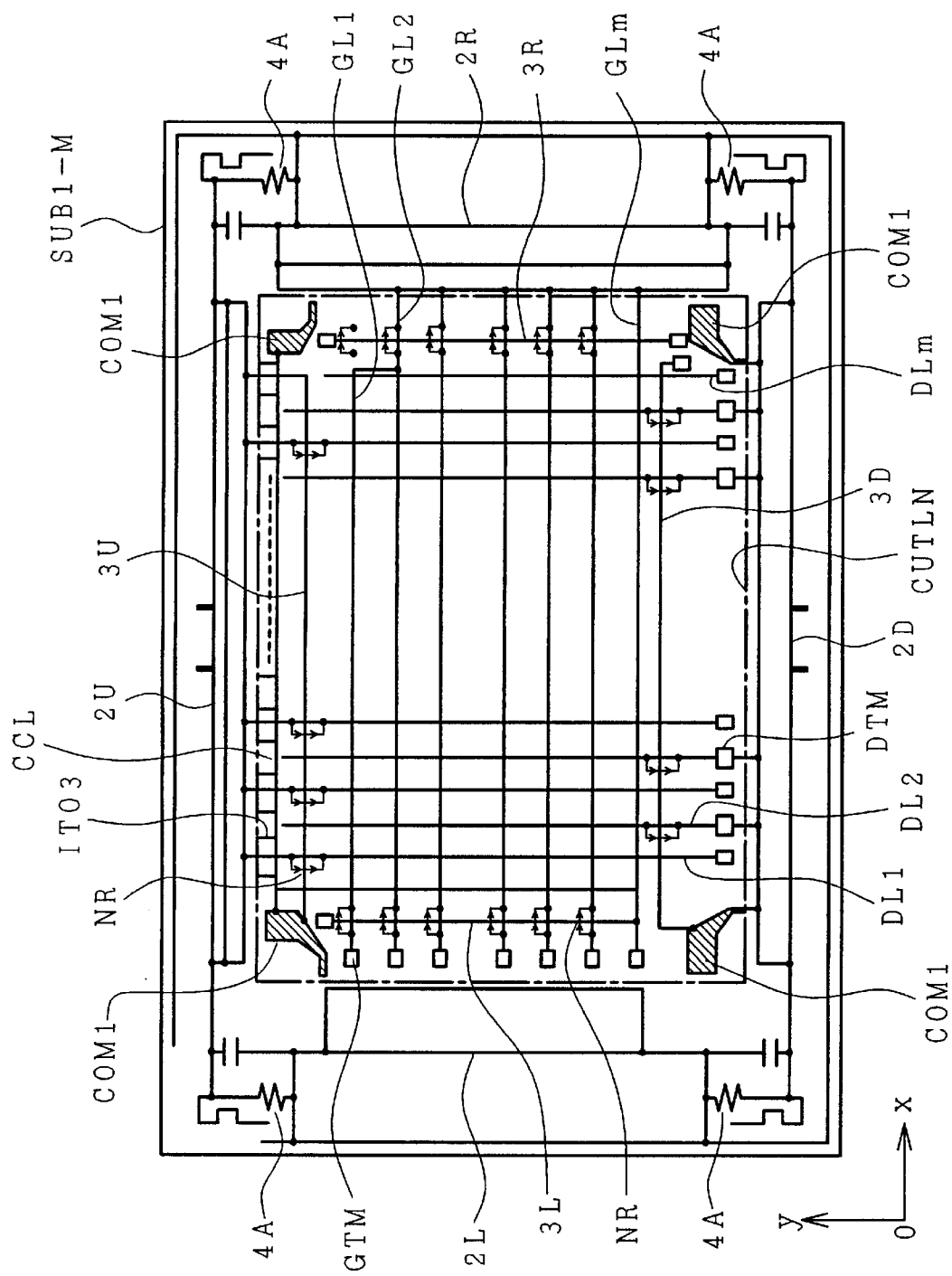
FIG. 5 is a diagrammatic plan view illustrating an intermediate product of an active matrix substrate which constitutes a liquid crystal display device according to the present invention, i.e., an example of the construction of a product which has not yet been cut into a liquid crystal display panel.

FIG. 5 is a plan view illustrating an intermediate product of an active matrix substrate which constitutes a liquid crystal display device according to the present invention, i.e., an example of the construction of a product which has not yet been cut into a liquid crystal display panel. In FIG. 5, symbol SUB1-M denotes a mother glass from which an active matrix substrate (SUMBI) has not yet been cut along a cut line CUTLN shown by a dot-dash line.

Gate lines GL (GL1, GL2, - - - , GLm) which extend in the x direction (scanning direction) and are juxtaposed in the y direction are formed over this mother glass SUB1-M. Each of the gate lines GL has a gate terminal portion GTM at one end, and an output terminal of a gate driving circuit (CHI) for supplying a scanning driving signal is connected to the gate terminal portion GTM.

The other (in FIG. 5, right-hand) ends of the gate lines are connected to an inspection terminal 2R which extends outside the cut line CUTLN. A probe is sequentially brought into contact with the portion between the inspection terminal 2R and each of the gate terminal portions GTM to detect a current which flows therebetween, whereby the presence or absence of a disconnection in each of the gate lines GL (GL1, GL2, - - - GLm) can be determined by inspection.

Incidentally, a conductor pattern 2L similar to the inspection terminal 2R is formed in an area which extends outside of the cut-line CUTLN on the side (in FIG. 5, left-hand) of the one end of each of the gate lines GL (GL1, GL2, - - - , GLm). This, conductor pattern 2L does not function as an inspection terminal, but by forming the scaling material SL, it is possible to protect thin-film transistors formed over the active matrix substrate from static electricity.

The video signal lines (drain lines) DL (DL1, DL2, - - - DLm), which are insulated from the gate lines GL, extend in the y direction as viewed in FIG. 5 and are juxtaposed in the x direction, are formed over the active matrix substrate. A terminal portion DTM is formed at one end of each of the drain lines DL (on the bottom side of FIG. 5) in the inside vicinity of the cut line CUTLN. The output terminal of a drain driving circuit (CHI) for supplying a video signal is connected to the terminal portion DTM.

On the side of one end of each of the drain lines DL (in FIG. 5, the top side), for example, the odd-numbered ones of the drain lines DL are formed to extend outward from the cut line CUTLN and are connected to an inspection terminal 2U formed outside the cut line CUTLN. On the side of the other ends of the respective drain lines DL (in FIG. 5, the bottom side), the even-numbered ones of the drain lines DL are formed to extend outward from the cut fine CUTLN and are connected to an inspection terminal 2D formed outside the cut line CUTLN. A probe is brought into contact with the portion between the inspection terminals 2U and 2D to detect a current which flows therebetween, whereby the presence or absence of a disconnection in adjacent ones of the drain lines DL can be determined by inspection. In addition, by bringing a probe into contact with the portion between the inspection terminals 2R and 2U or 2D to detect a current which flows therebetween, it is possible to detect the presence or absence of a disconnection between drain and gate lines.

The common electrode connecting terminals COM1 for connection to the common electrodes of a color filter substrate are respectively formed at four comers of the cut line CUTLN. The conductor layers IT03 described previously in connection with the aforesaid embodiment and the connecting line layer CCL for connecting the conductor layers IT03 to the common electrode connecting terminals COM1 are formed on the top side of the cut fine CUTLN.

Although, in FIG. 5, the conductor layers IT03 which prevent static electricity from entering the drain lines DL are formed on only the top side of the cut line CUTLN, the conductor layers IT03 can also be similarly formed on the bottom side, or on the sides of the gate lines (in FIG. 5, on at least either one of the right and left sides). Although not shown the active matrix substrate is coated with a sealing material for bonding the active matrix substrate to the color filter substrate, in such a manner that the sealing material is located inside the conductor layers IT03. By adopting this construction, it is possible to prevent breakdowns of switching elements NR, such as a thin-film transistors arranged at the crossings of drain lines and ate lines, or disconnections or resistance increases of various lines, such as the drain lines or electrodes.

Details of a liquid crystal display device which includes a liquid crystal panel using the active matrix substrate according to the present invention will be described below.

Figure 6:
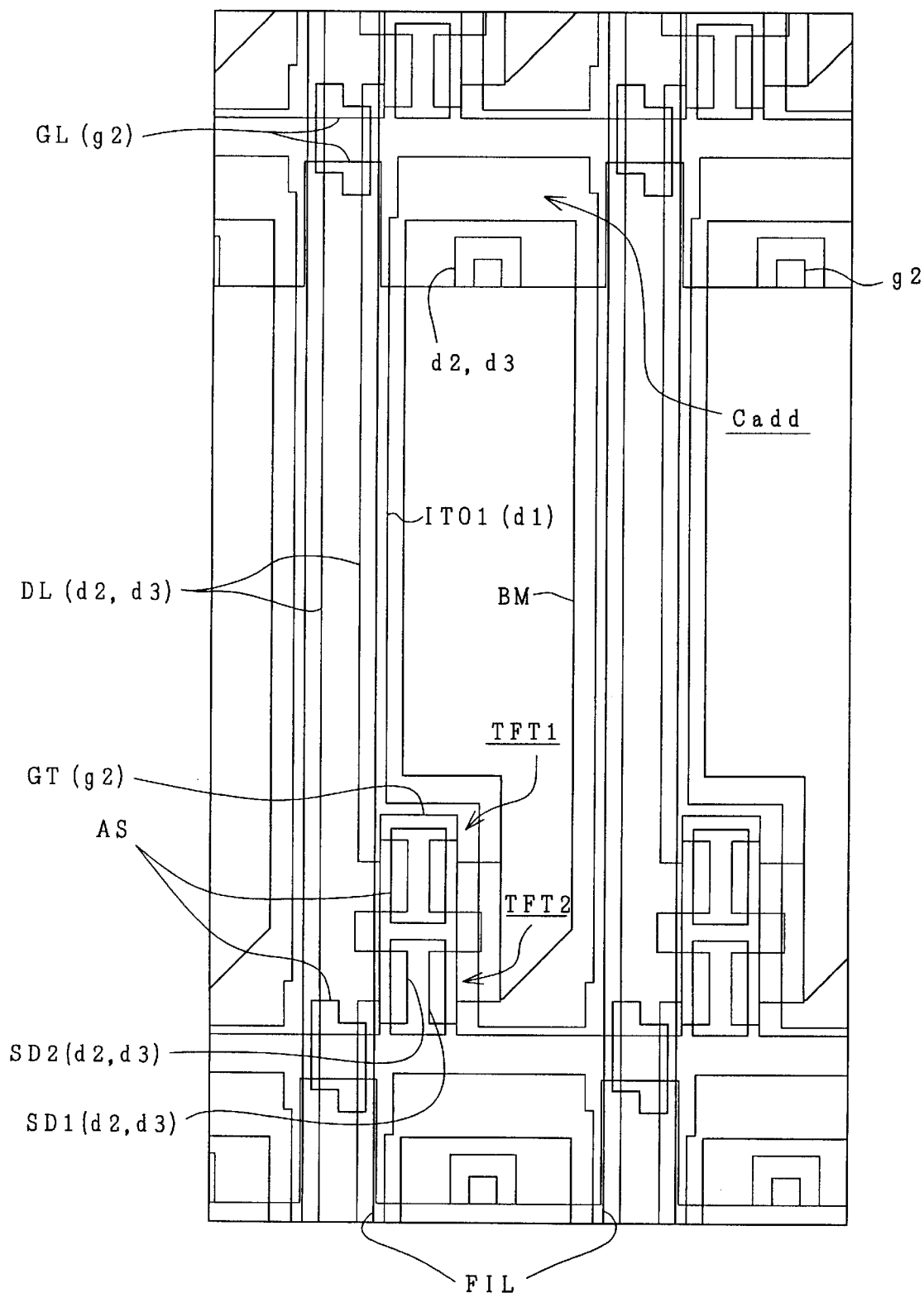
FIG. 6 is a plan view illustrating one pixel and a neighboring construction of a liquid crystal display device to which the present invention is applied.

FIG. 6 is a plan view illustrating one pixel and its neighboring construction in a liquid crystal display device to which the present invention is applied. Each pixel is arranged in the crossing area of two adjacent gate lines GL (in FIG. 6, gate lines GL (g2)) and two adjacent drain lines DL (in FIG. 6, data tines DL (d2 and d3)), (i.e., in the area surrounded by four signal lines).

Each pixel includes a thin-film transistor TFT (formed by two thin-film transistors TFT1 and TFT2), which operates as a switching clement, a transparent pixel electrode ITOI, and an added capacitor (holding capacitive element) Cadd. The gate lines GL are arranged as a plurality of gate lines each of which is formed to extend in the x direction (the column direction) and be juxtaposed in the y direction (the row direction). The drain lines DL are arranged as a plurality of drain lines, each of which is formed to extend in the y direction and be juxtaposed in the x direction. A gate electrode GT (g2) is connected to the gate line GL, and a drain electrode (SD2 (d2 and d3)) is connected to the drain line DL. Symbol ITOI (d1) denotes a pixel electrode which is connected to a source electrode (SD1 (d2 and d3)) of the thin-film transistor TFIF. Symbol AS denotes an amorphous Si layer, and symbols d1, d2, d3 and g2 denote conductor layers. In FIG. 6, a color filter FIL and a black matrix BM are formed in a color filter substrate, and are shown to indicate positions at which the color filter FIL and the black matrix BM are arranged.

Figure 7:
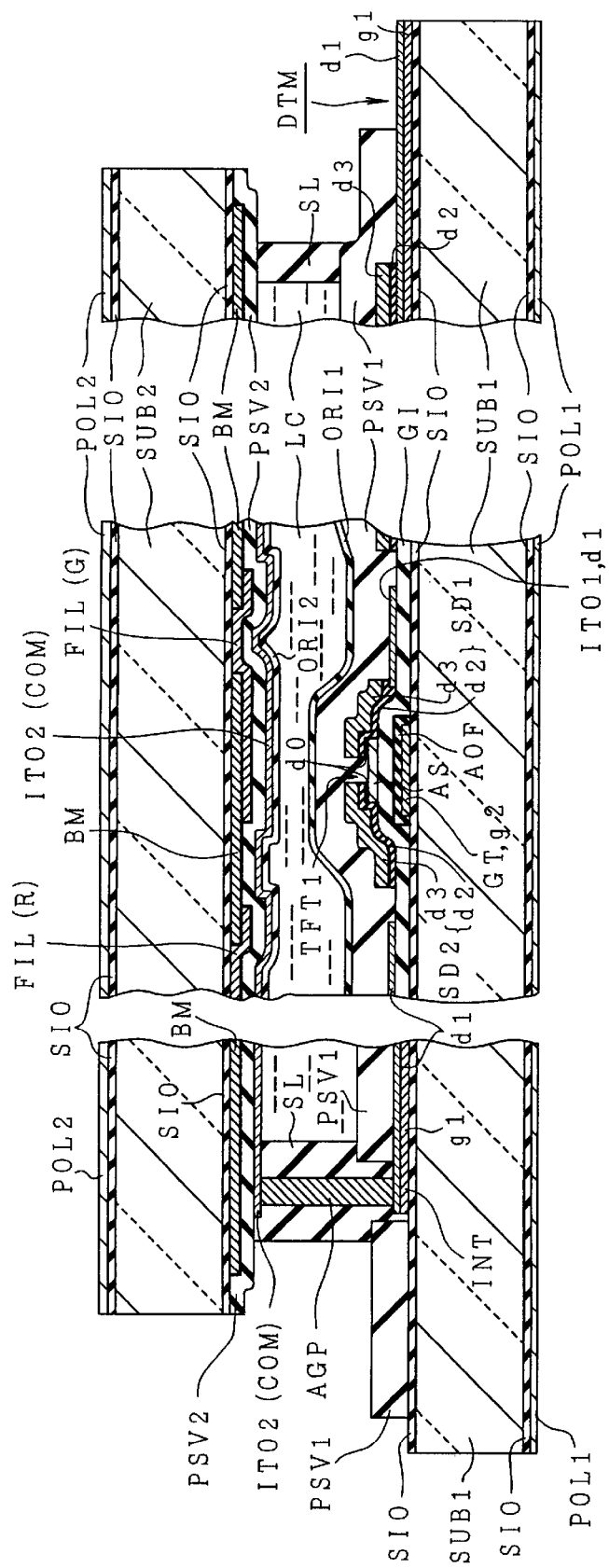
FIGS. 7A, 7B and 7C are cross-sectional views of essential portions, illustrating one example of the structure of a liquid crystal display device in which an active matrix substrate and a color filter substrate are bonded together, with a liquid crystal being scaled therebetween.

FIGS. 7A, 7B and 7C are cross-sectional views of essential portions, illustrating one example of the structure of a liquid crystal display device in which an, active matrix substrate and a color filter substrate are bonded together and a liquid crystal material is sealed therebetween. FIGS. 7A and 7C show end portions, and FIG. 7B shows a portion of a display area having thin-film transistors.

The thin-film transistors TFT, as well as the various lines, electrodes, insulation layer and the like, are formed over the inside surface of the active matrix substrate SUB1, and an lower alignment layer OR11 is formed as the uppermost layer which is in contact with the liquid crystal LC. Incidentally, symbol POLL denotes a lower polarizer, and symbol SIO denotes a silicon oxide layer for smoothing the surfaces of a glass plate which forms the active matrix substrate SUB1. This silicon oxide layer SIO is not necessarily needed. Symbol AOF denotes an insulation layer, and symbols g1, g2, d1, d2 and d3 denote conductor layers.

Formed over the internal surface of the color filter substrate SUB2 are common electrodes IT02 (COM), a black matrix BM, color filters FIL for three colors (in FIG. 7B, only a green filter (G) is shown) and a transparent protective film PSV2, and an alignment layer OR12 is formed as the lowermost layer. In addition, an upper polarizer POLI is formed over the outside surface of the color filter substrate SUB2. Like to the active matrix substrate SUB1, the silicon oxide layers SIO are formed over the surfaces of the color filter substrate SUB2, but are not necessarily needed.

The sealing material shown in FIGS. 7A and 7C is made of an epoxy resin, and a silver paste AGP is interposed as a conductive material between a common electrode connecting terminal COM1 (not shown) which is coupled to an interconnection line INT which supplies a common electrode voltage to a common electrode connecting line and common electrode connecting terminals COM2 (not shown) which are coupled to the common electrodes IT02 (COM) of the color filter substrate SUB2.

Figure 8:
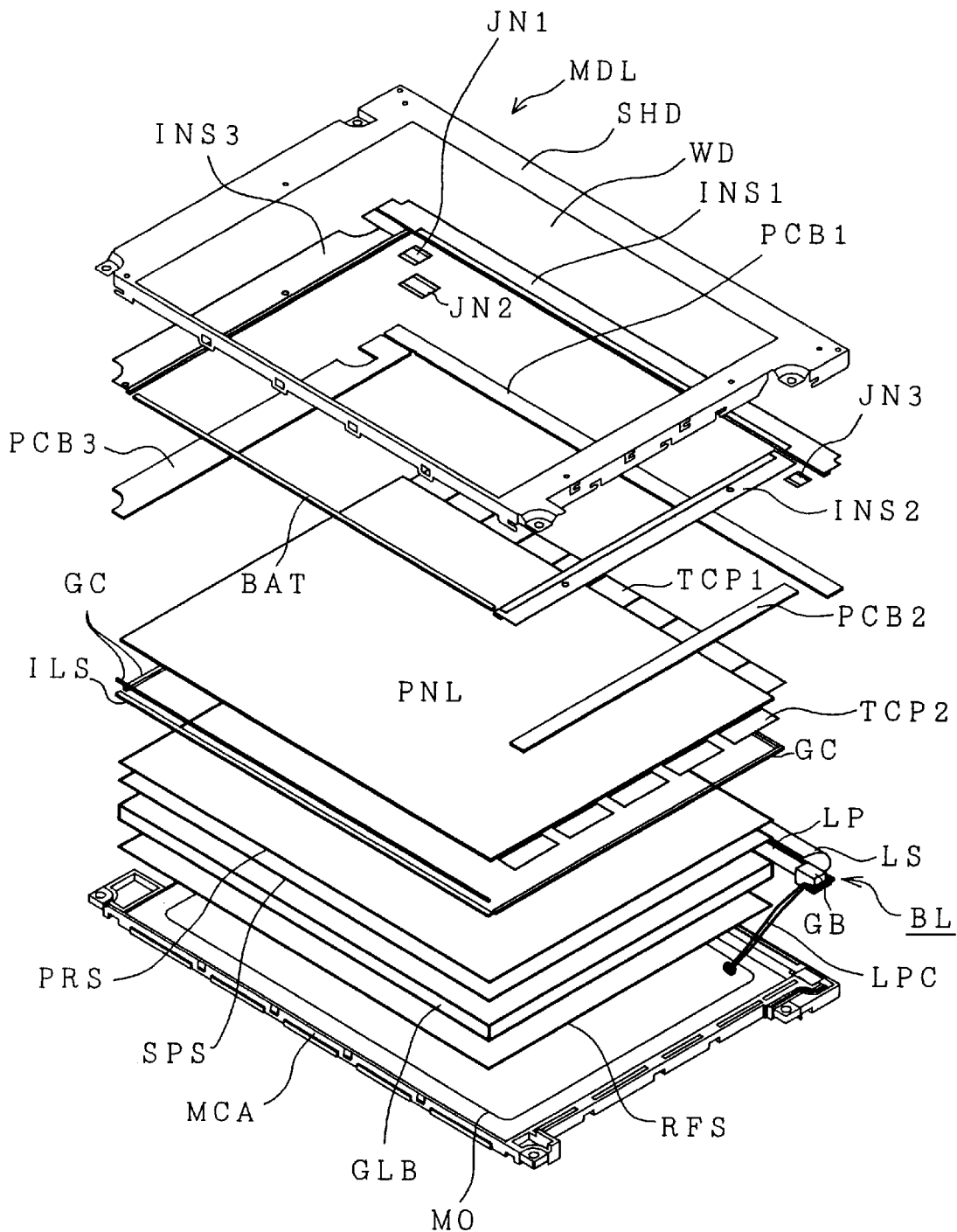
FIG. 8 is an exploded perspective view showing individual constituent components of a liquid crystal display module using the liquid crystal display device according to the present invention.

FIG. 8 is an exploded perspective view showing individual constituent components of a liquid crystal display module using the liquid crystal display device according to the present invention. Symbol SHD denotes an upper frame, symbol WD denotes a display window, symbol PNL denotes a liquid crystal display panel, symbol SPS denotes an optical diffusion sheet, symbol GLB denotes a light guide body, symbol RFS denotes a reflecting sheet, symbol BL denotes a back light, and symbol MCA denotes a lower frame. These individual members are stacked in a layered arrangement as shown in FIG. 8 to assemble a so-called liquid crystal display module MDL. The liquid crystal display module MDL is secured as a whole by claws provided on the upper frame SHD and hooks formed on the lower frame MCA.

In the periphery of the upper frame SHD, driving circuit boards (a gate side circuit board and a drain side circuit board) PCB1 and PCB2 and an interface circuit board PCB3 are connected to the liquid crystal display panel PNL and to one another by tape carrier pads TCPL and TCP2 or joiners JN1, JN2 and JN3. The lower frame MCA has a shape in which the diffusion sheet SPS, the light guide body GLB and the reflecting sheet RFS, which constitute the back light BL, are accommodated in an opening MO. Although a linear lamp is arranged on one side of the light guide body GLB, the illustration of the linear lamp is omitted. Light emitted from this linear lamp is transmitted toward the liquid crystal display panel PNL as is illuminating light to be uniformly projected onto a display screen by the light guide body GLB, the reflecting sheet RFS and the diffusion sheet SPS. Incidentally, symbol LS denotes a reflecting sheet with which a backlighting fluorescent tube LP is equipped. A prism sheet PRS for adjusting the propagation path of illuminating light is sandwiched between this back light BL and the liquid crystal display panel PNL with a light blocking spacer ILS interposed therebetween.

Figure 9:
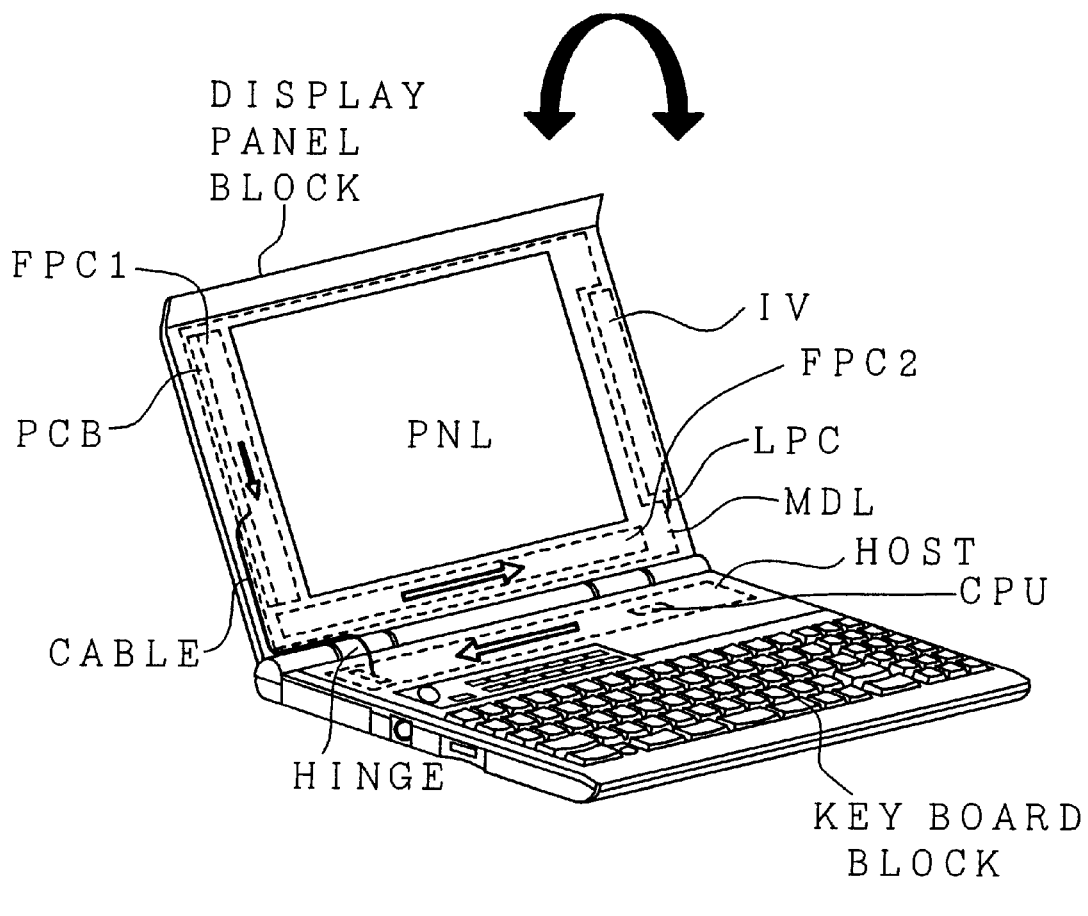
FIG. 9 is a perspective view of a notebook type personal computer, illustrating an example in which a liquid crystal display device according to the present invention is mounted.

FIG. 9 is a perspective view of a notebook type personal computer, illustrating an example in which a liquid crystal display device according to the present invention is mounted. This notebook computer (portable computer) is comprised of a keyboard block (a body block) and a display block which is coupled to this keyboard block by a hinge. A keyboard, and signal generating functions such as a host (host computer) and a CPU are accommodated in the keyboard block, and the liquid crystal display module described previously with reference to FIG. 8 is mounted in the display block and the liquid crystal display panel PNL which constitutes a display screen is exposed. Driving circuit boards FPCL and FPC2, a circuit board PCB on which a control chip TCON is mounted, and an inverter power supply board IV which is a back light power supply are mounted on the periphery of the liquid crystal display panel PNL.

As a matter of course, the present invention is not limited to any of the above-described embodiments and various modifications can be made without departing from the technical concept of the present invention.

As described hereinabove, in accordance with the present invention, it is possible to prevent breakdowns of switching elements, such as a thin-film transistor and disconnections of other lines, by effectively absorbing static electricity which tends to penetrate drain lines, thereby making it possible to provide a highly reliable liquid crystal display device which enables a high quality image display.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A liquid crystal display device, comprising:

an active matrix substrate having a main surface over which are formed a plurality of switching elements for respectively selecting a plurality of pixels arranged in a display area of said liquid crystal display device, a plurality of scanning signal lines and a plurality of video signal lines for applying driving signals to said plurality of switching elements, pixel electrodes and common electrode connecting terminals;

a color filter substrate which is bonded to said active matrix substrate to confront said active matrix substrate with a predetermined gap interposed therebetween and which has a main surface on which common electrodes which constitute said pixels together with said pixel electrodes are formed; and a liquid crystal layer sealed in said predetermined gap, said active matrix substrate and said color filter substrate being secured to a periphery of the display area with a sealing material clamped between said active matrix substrate and said color filter substrate, said common electrode connecting terminals and said common electrodes being connected to each other via a conductive paste between said active matrix substrate and said color filter substrate, wherein a plurality of conductive layers are formed over said video signal lines with an insulation layer interposed therebetween and cut end faces of said plurality of conductive layers are exposed on a side surface of said active matrix substrate, and an interconnection line layer which connects said plurality of conductive layers to said common electrode connecting terminals being formed over said main surface of said active matrix substrate.

2. A liquid crystal display device according to claim 1, wherein each of said conductive layers is formed in a linear shape which extends along a longitudinal (extending) direction of said video signal lines, at a position corresponding to a portion between adjacent ones of said plurality of video signal lines.

* * * * *